United States Patent
Oshima

(10) Patent No.: US 12,425,523 B2
(45) Date of Patent: Sep. 23, 2025

(54) CONTENT PROVISION DEVICE, CONTENT PROVISION METHOD, PROGRAM, AND RECORDING MEDIUM FOR PROVIDING CONTENT BASED ON READING OF AN IMAGE PRINTED ON A MEDIUM

(71) Applicant: FUJIFILM Corporation, Tokyo (JP)

(72) Inventor: Hiroyuki Oshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 84 days.

(21) Appl. No.: 18/172,846

(22) Filed: Feb. 22, 2023

(65) Prior Publication Data

US 2023/0276005 A1 Aug. 31, 2023

(30) Foreign Application Priority Data

Feb. 25, 2022 (JP) .................................. 2022-027731
Mar. 22, 2022 (JP) .................................. 2022-045472

(51) Int. Cl.
 *H04N 1/00* (2006.01)
 *H04N 1/34* (2006.01)

(52) U.S. Cl.
 CPC ..... *H04N 1/00846* (2013.01); *H04N 1/00824* (2013.01); *H04N 1/00883* (2013.01); *H04N 1/346* (2013.01)

(58) Field of Classification Search
 None
 See application file for complete search history.

(56) References Cited

U.S. PATENT DOCUMENTS

2011/0090529 A1 * 4/2011 Hertling ............... G06F 3/1204
 358/1.15
2013/0235423 A1 * 9/2013 Hagiwara ............. G06F 3/1204
 358/1.15

(Continued)

FOREIGN PATENT DOCUMENTS

EP 3531649 A1 8/2019
JP 2015210807 A * 11/2015

(Continued)

OTHER PUBLICATIONS

Kazama (JP-2015-210807) English Translation of JP reference provided by Applicant (Year: 2015).*

(Continued)

*Primary Examiner* — Miya J Cato
(74) *Attorney, Agent, or Firm* — Studebaker Brackett PLLC

(57) ABSTRACT

Provided are a content provision device, a content provision method, a program, and a recording medium capable of appropriately displaying content provided by reading a printed matter of an image acquired via a network.

In the present invention, at least a part of a target image provided by a first user is set as a first image, content displayed on a display screen of a terminal of a second user is stored in association with the first image, data for printing is transmitted to the terminal, a read image is received from the terminal in a case in which a printed matter generated by printing a target image and a second image on a designated medium in accordance with the data for printing is read by the terminal, a storage destination is specified from a portion corresponding to the second image in the read image, and display data for displaying the content stored in the storage destination at a position in the display screen in accordance (Continued)

with a portion corresponding to the first image in the read image is transmitted to the terminal.

20 Claims, 11 Drawing Sheets

(56) References Cited

U.S. PATENT DOCUMENTS

| | | | | |
|---|---|---|---|---|
| 2016/0078904 | A1* | 3/2016 | Yamaji | G11B 27/005 |
| | | | | 382/103 |
| 2018/0107876 | A1* | 4/2018 | Lee | G06T 11/00 |
| 2019/0005729 | A1* | 1/2019 | Ito | G06T 19/006 |
| 2019/0240577 | A1* | 8/2019 | Oshima | A63F 13/46 |
| 2019/0289084 | A1* | 9/2019 | Duan | G06V 10/22 |
| 2022/0075578 | A1* | 3/2022 | Kawakami | G06F 3/1238 |
| 2022/0321351 | A1* | 10/2022 | Yucra Rodriguez | H04L 51/42 |

FOREIGN PATENT DOCUMENTS

| | | |
|---|---|---|
| JP | 2016-058024 A | 4/2016 |
| JP | 2019-192016 A | 10/2019 |

OTHER PUBLICATIONS

The extended European search report issued by the European Patent Office on Jul. 3, 2023, which corresponds to European Patent Application No. 23158177.8-1224 and is related to U.S. Appl. No. 18/172,846.

Fujifilm; "Instax square link", Oct. 27, 2022, pp. 1-4, https://instax.com/square_link/en/, XP093056089.

* cited by examiner

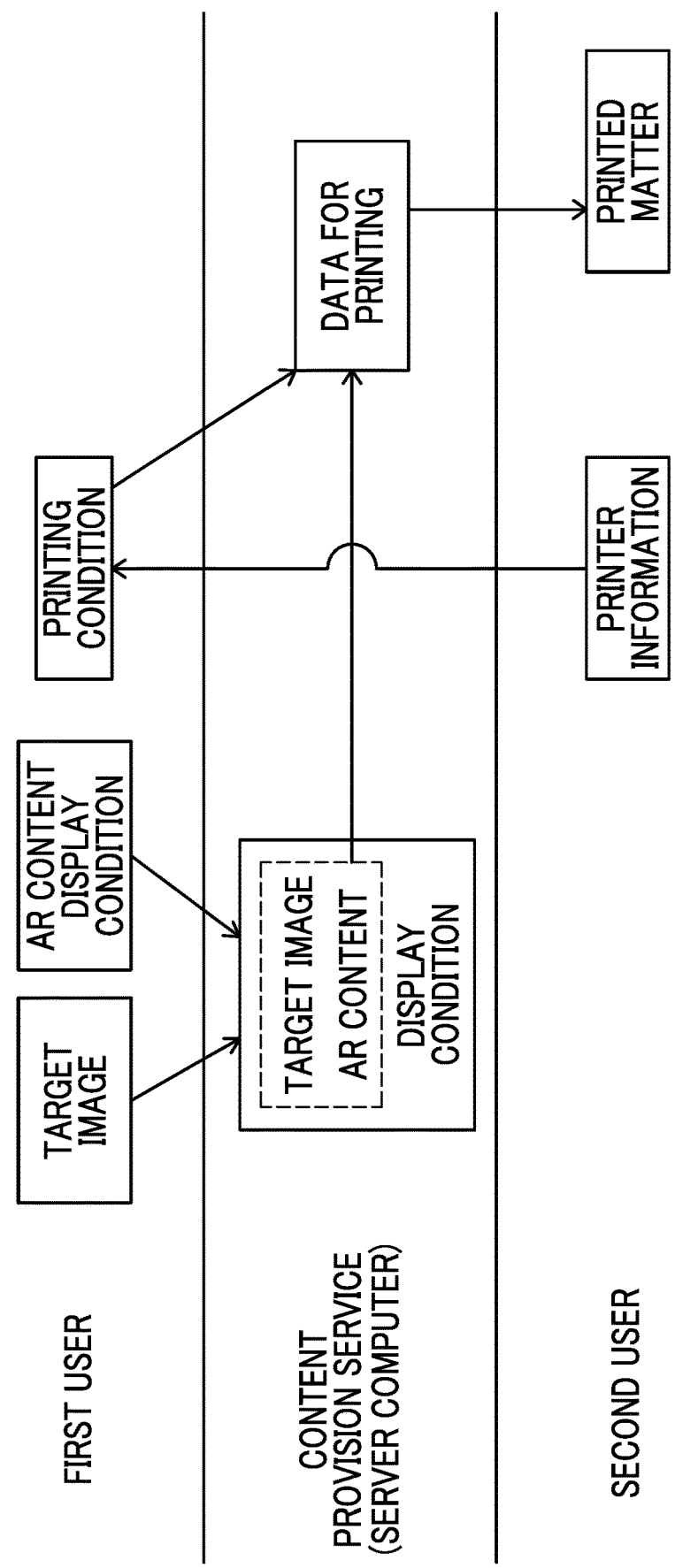

FIG. 6

| ID INFORMATION OF FIRST TERMINAL | STORAGE DESTINATION OF AR CONTENT | ID INFORMATION OF SECOND TERMINAL | PRINTER INFORMATION | PRESENCE OR ABSENCE OF PAYMENT (PAYMENT AMOUNT) | PROVISION AVAILABLE PERIOD | THE NUMBER OF PROVISION AVAILABLE TIMES |
|---|---|---|---|---|---|---|
| T1000a | ¥¥xxx¥yyy··· | T2000b | SIZE: NORMAL | PRESENCE (1,000 YEN) | 2/10/2022 TO 2/28/2022 | 5 TIMES |
| · · · · · | · · · · · | · · · · · | · · · · · | · · · · · | · · · · · | · · · · · |

CONTENT PROVISION DEVICE, CONTENT PROVISION METHOD, PROGRAM, AND RECORDING MEDIUM FOR PROVIDING CONTENT BASED ON READING OF AN IMAGE PRINTED ON A MEDIUM

CROSS-REFERENCE TO RELATED APPLICATIONS

The present application claims priority under 35 U.S.C. § 119 to Japanese Patent Application No. 2022-027731, filed on Feb. 25, 2022 and Japanese Patent Application No. 2022-045472, filed on Mar. 22, 2022. The above applications are hereby expressly incorporated by reference, in its entirety, into the present application.

BACKGROUND OF THE INVENTION

1. Field of the Invention

The present invention relates to a content provision device, a content provision method, a program, and a recording medium that provide content by using, as a trigger, reading of an image printed on a medium.

2. Description of the Related Art

With the spread of network communication technology, images can be transmitted to each other between users, and the image provided by one user can be printed by the other user side (see, for example, JP2019-192016A).

Moreover, in a case in which the printed image is read by a reading device for the reason of promoting printing of the provided image, the content may be provided by using the reading thereof as a trigger (see, for example, JP2016-58024A). JP2016-58024A discloses that predetermined video content is combined with a video of the printed matter displayed on an information terminal by imaging (capturing) the printed matter or the like using the information terminal, such as a smartphone or the like, and is displayed. That is, with the technology disclosed in JP2016-58024A, the content for augmented reality (AR) is provided.

SUMMARY OF THE INVENTION

In the technology of JP2016-58024A, the content provided by using, as a trigger, the reading of the printed matter is displayed at a position decided with a part (so-called marker) of the image printed on the printed matter as a reference. That is, on a display screen of the information terminal that images the printed matter, the content is displayed at a position corresponding to the position of the marker.

On the other hand, the position of the marker with respect to the printed matter (specifically, a relative position between the printed matter and the marker) may be changed depending on, for example, a size of a medium on which the image is printed. Therefore, in a case in which the size of the medium used for printing the image is not an appropriate size, there is a probability that the content displayed by imaging (capturing) the printed matter is not appropriately displayed on the display screen.

The present invention has been made in view of the above circumstances, and specifically, is to provide a content provision device, a content provision method, a program, and a recording medium capable of, in a case in which an image acquired via a network is printed, appropriately displaying content provided by reading a printed matter thereof.

In order to achieve the object described above, an aspect of the present invention relates to a content provision device comprising a processor, in which the processor executes processing of setting at least a part of a target image provided by a first user as a first image, processing of storing content displayed on a display screen of a terminal of a second user in association with the first image, processing of transmitting data for printing for printing the target image and a second image in accordance with a storage destination of the content on a designated medium which is designated by a first user side, to the terminal, processing of receiving, in a case in which a printed matter generated by printing the target image and the second image on the designated medium in accordance with the data for printing is read by the terminal, a read image of the read printed matter from the terminal, processing of specifying the storage destination from a portion corresponding to the second image in the read image, and processing of transmitting display data for displaying the content stored in the storage destination at a position in the display screen in accordance with a portion corresponding to the first image in the read image, to the terminal.

Moreover, in the processing of transmitting the display data, the processor may transmit the display data for displaying the content in a state in which the content is combined with the read image displayed on the display screen, to the terminal.

Moreover, the processor may further execute processing of acquiring setting information indicating a setting content related to display of the content. In this case, the processor may transmit the display data for displaying the content in accordance with the setting content, to the terminal.

Moreover, in the processing of transmitting the display data, the processor may transmit the display data for displaying the content, which is stored in the storage destination and is set by the first user, to the terminal.

Moreover, in the processing of transmitting the data for printing, the processor may transmit the data for printing for printing the target image and the second image on the designated medium of which a size is designated by the first user side, to the terminal.

Moreover, the number of transmission available times of the display data may be stored in a storage device for each user. In this case, the processor may further execute processing of decreasing the number of transmission available times of the second user in accordance with the number of execution times of the processing of transmitting the display data to the terminal. Moreover, in a case in which a remaining number of the number of transmission available times of the second user is 0, transmission of the display data to the terminal may be limited.

Moreover, presence or absence of payment for a charge of the display data may be stored in a storage device. In this case, the processor may transmit the display data to the terminal of the second user who has paid the charge.

Moreover, the processor may further execute processing of remitting an amount of at least a part of the charges paid by the second user to a predetermined remittance destination.

Moreover, the processor may further execute processing of updating the content stored in the storage destination in association with the first image, and may transmit, in the processing of transmitting the display data to the terminal after the content is updated, the display data for displaying the content after updating at the position.

Moreover, the first user may use a first terminal and the terminal used by the second user may be a second terminal, and the first terminal may acquire printer information related to a printer used by the second user to print an image. In this case, the processor may transmit the data for printing for printing the target image and the second image on the designated medium in accordance with the printer information acquired by the first terminal, to the second terminal.

Moreover, in order to solve the object described above, another aspect of the present invention relates to a content provision method comprising causing a processor to execute a step of setting at least a part of a target image provided by a first user as a first image, a step of storing content displayed on a display screen of a terminal of a second user in association with the first image, a step of transmitting data for printing for printing the target image and a second image in accordance with a storage destination of the content on a designated medium which is designated by a first user side, to the terminal, a step of receiving, in a case in which a printed matter generated by printing the target image and the second image on the designated medium in accordance with the data for printing is read by the terminal, a read image which is an image of the read printed matter from the terminal, a step of specifying the storage destination from a portion corresponding to the second image in the read image, and a step of transmitting display data for displaying the content stored in the storage destination at a position in the display screen in accordance with a portion corresponding to the first image in the read image, to the terminal.

Moreover, in the step of transmitting the display data, the processor may transmit the display data for displaying the content in a state in which the content is combined with the read image displayed on the display screen, to the terminal.

Moreover, the processor may further execute a step of acquiring setting information indicating a setting content related to display of the content. In this case, in the step of transmitting the display data, the processor may transmit the display data for displaying the content in accordance with the setting content, to the terminal.

Moreover, the processor may further execute a step of updating the content stored in the storage destination in association with the first image. In this case, in the step of transmitting the display data to the terminal after the content is updated, the processor may transmit the display data for displaying the content after updating at the position.

Moreover, according to still another aspect of the present invention, it is possible to realize a program causing a computer to execute each step included in the content provision method described above. Further, according to still another aspect of the present invention, it is possible to realize a computer-readable recording medium in which a program causing a computer to execute each step included in the content provision method described above is recorded.

According to the present invention, in a case in which the image acquired via the network is printed, it is possible to appropriately display the content provided by reading the printed matter.

BRIEF DESCRIPTION OF THE DRAWINGS

FIG. 2A is a diagram showing a procedure for providing the content (part 1).
FIG. 6 is a diagram showing an example of management data stored in a storage device.

DESCRIPTION OF THE PREFERRED EMBODIMENTS

One embodiment of the present invention (hereinafter, the present embodiment) will be described with reference to the drawings. It should be noted that the embodiment described below is merely an example for ease of understanding of the present invention, and is not intended to limit the present invention. Moreover, the present invention may be changed or improved from the embodiment described below without departing from the spirit of the present invention. Moreover, the present invention includes its equivalents.

In the present specification, the concept of "device" includes a single device that exerts a specific function in one device, and includes a plurality of devices that are distributed and present independently of each other and exert a specific function in cooperation (coordination) with each other.

Moreover, in the present specification, an "image" is image data unless otherwise specified. Examples of the image data include lossy compressed image data, such as joint photographic experts group (JPEG) format, and lossless compressed image data, such as graphics interchange format (GIF) or portable network graphics (PNG) format.

Moreover, in the present specification, a "user" is a user who uses a content provision device according to the embodiment of the present invention. To use the content provision device is to use a function of the content provision device, and to use the function of the content provision device by another device (for example, a terminal owned by the user), in addition to directly operating the content provision device.

Moreover, the user may be an individual, a group including a plurality of persons, such as a family, a corporation, such as a company, an institution, or another organization.

Content Provision Service

A service (hereinafter, a content provision service) realized by the content provision device and a content provision method according to the present embodiment will be described. The user (first user) can provide the content to another user (second user) through the content provision service. The second user can receive and use the content provided in response to a request from the first user through the content provision service.

The content is digital content, and in particular, the content that can be displayed on a display device, such as a display. In the present embodiment, the content for augmented reality (hereinafter, AR content) is provided. That is, on the second user side to which the AR content is provided, in a case of displaying a real-world video (specifically, a real-time video) captured by a camera or the like on the display, the AR content is combined with the video described above and displayed.

Figure 1A:
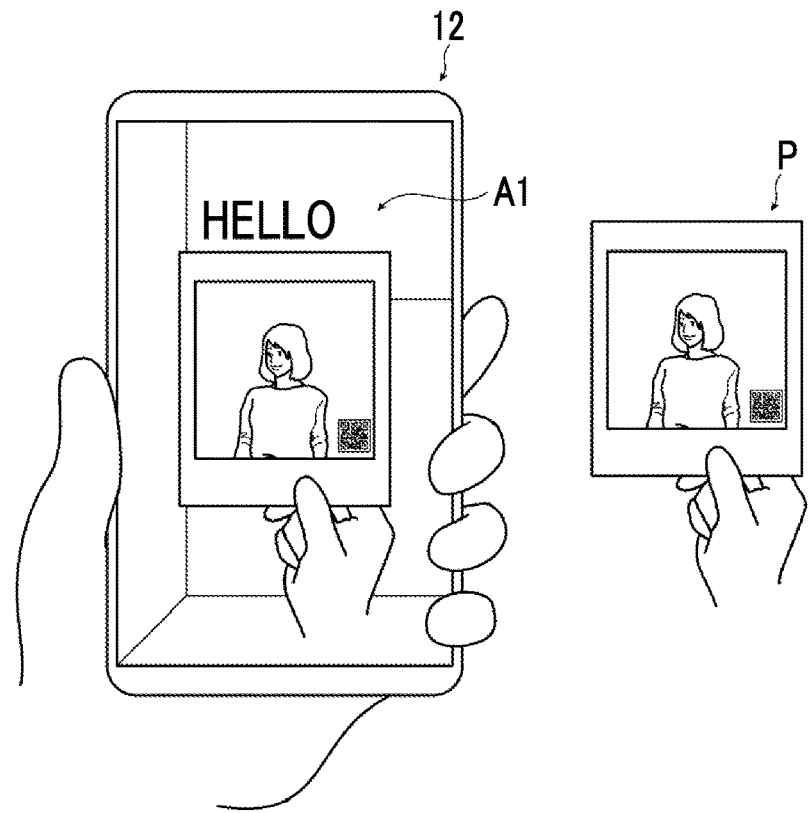
FIG. 1A is a diagram showing a first example of content.
Figure 1B:
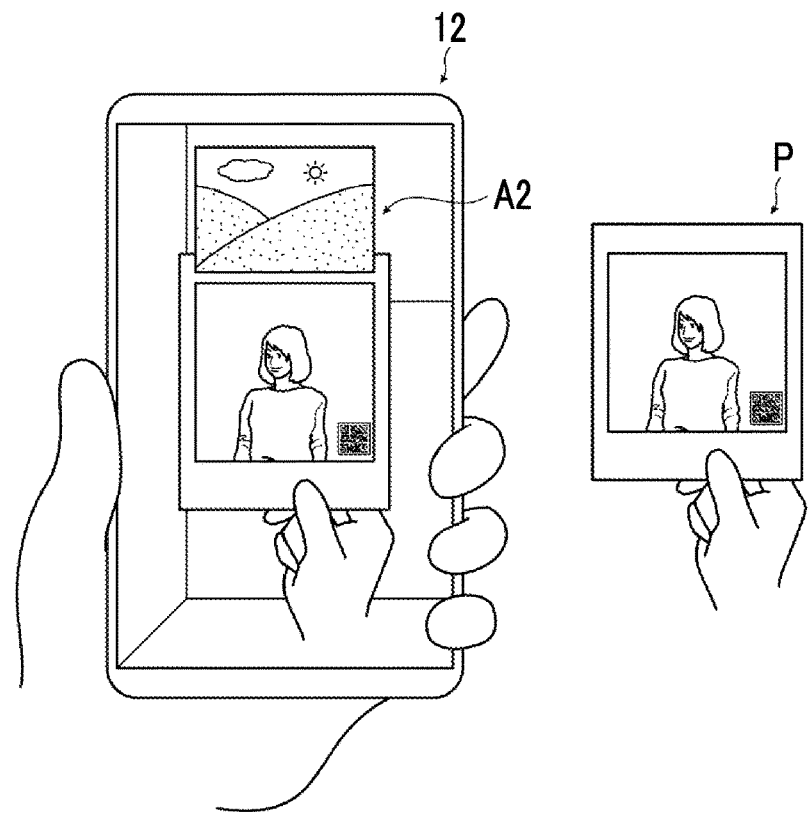
FIG. 1B is a diagram showing a second example of the content.
Figure 1C:
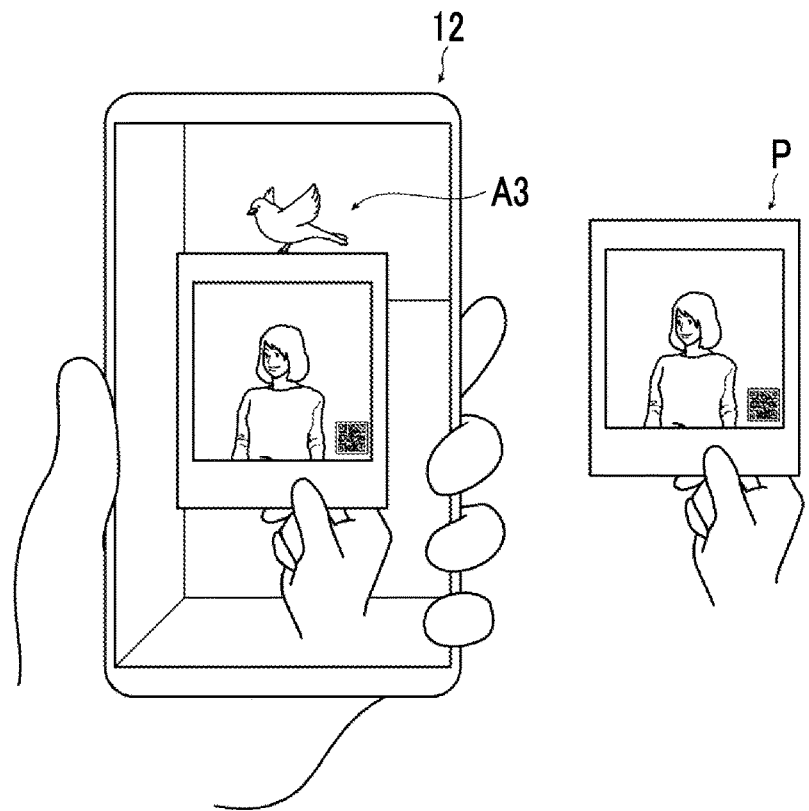
FIG. 1C is a diagram showing a third example of the content.
Figure 1D:
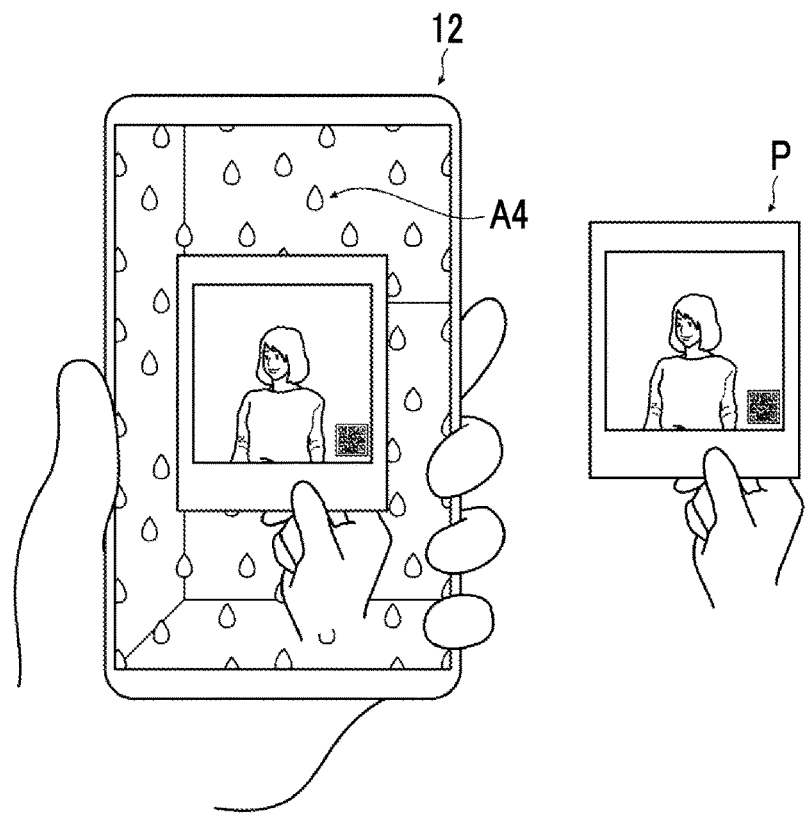
FIG. 1D is a diagram showing a fourth example of the content.

The AR content may be, for example, content A1 consisting of a text (message) as shown in FIG. 1A, or may be content A2 consisting of a moving image or a video as shown in FIG. 1B. Moreover, as shown in FIG. 1C, the AR content may be content A3 consisting of an illustration drawn by computer graphics. Moreover, as shown in FIG. 1D, the AR content may be content A4 that is combined with another video to add a background effect (in FIG. 1D, a background effect in which it rains).

It should be noted that the content may be displayed in a stationary state, may be displayed in a moving state, such as a moving image, or may be displayed with an audio output.

Figure 2B:
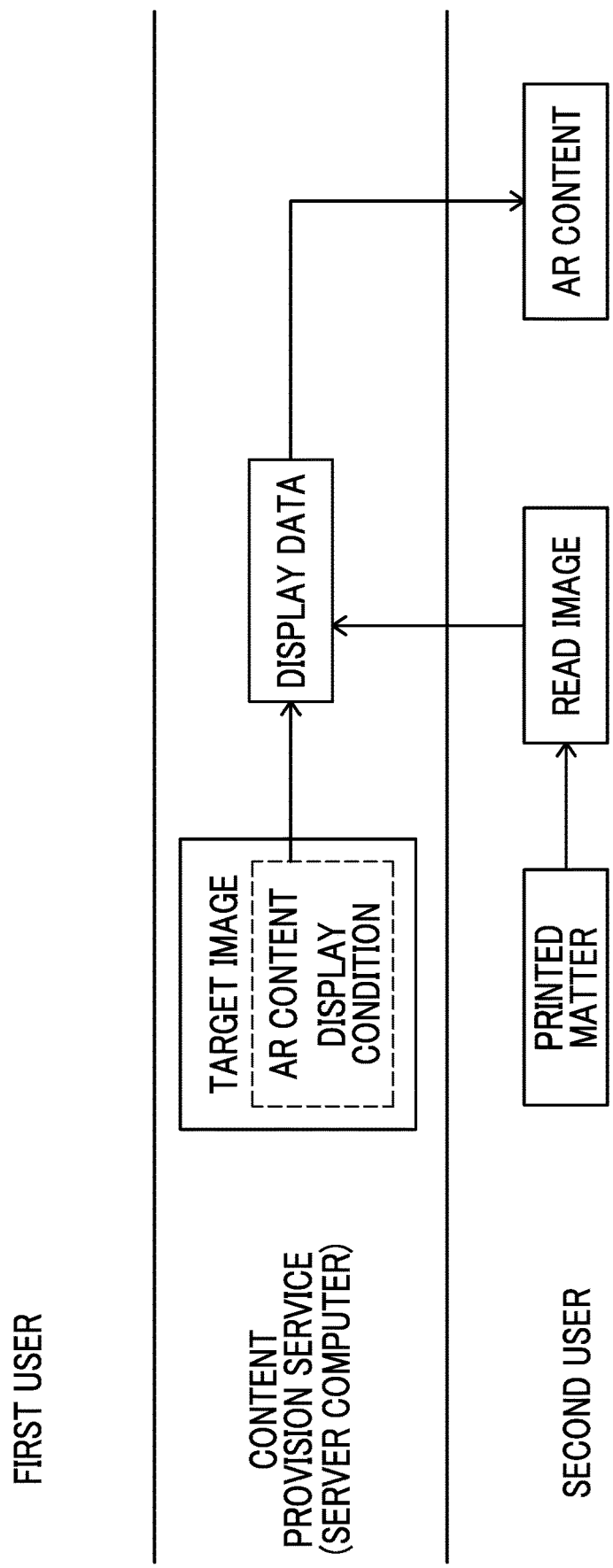
FIG. 2B is a diagram showing the procedure for providing the content (part 2).

A procedure for providing and using the AR content will be outlined with reference to FIGS. 2A and 2B. First, the first user transmits an image (hereinafter, a target image) necessary for providing the content. Here, "the first user transmits the target image" means that the target image is transmitted from an information processing terminal (hereinafter, a first terminal 11) used by the first user, specifically, that the target image is uploaded. Moreover, the target image is one or a plurality of images provided by the first user and designated from an image group held by the first user, and is, for example, an image purchased by the second user from the first user.

Moreover, as shown in FIG. 2A, the first user sets the AR content to be provided, and also sets a condition (display condition) in a case of displaying the AR content by the second user side. Setting the AR content is to newly create the AR content or to select any one of a plurality of types of the AR content prepared in advance.

The display condition of the AR content is a setting content related to the display of the AR content, for example, a display size, a display position, an orientation of the AR content, or the like in a case in which the AR content is displayed by the second user side. Here, the display position is decided with the position of the first image, which will be described below, as a reference position.

The content provision service generates data for printing based on the target image transmitted from the first user and information related to the AR content set by the first user (specifically, a storage destination of the AR content or the like). The data for printing is data for printing the image for obtaining the content. The generated data for printing is transmitted to the second user as shown in FIG. 2A. Here, "the data for printing is transmitted to the second user" means that the data is transmitted to an information processing terminal (corresponding to a terminal, hereinafter, a second terminal 12) used by the second user.

In a case in which the data for printing is received, the second user (specifically, the second terminal 12) prints the image for obtaining the content in accordance with the data for printing. A device used for printing the image for obtaining the content is, for example, a printer owned by the second user (specifically, a portable printer 13 described below). It should be noted that the present invention is not limited to this, and a printing device that is not owned by the second user, but can be used by logging in by inputting a password or account information, such as a device installed in a store or the like, may be used.

Figure 3:
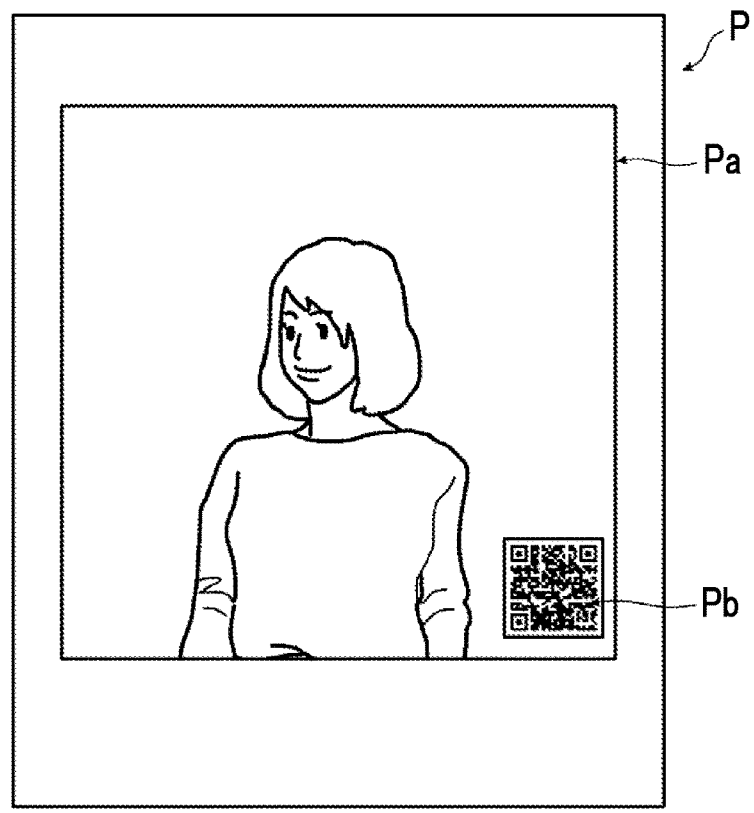
FIG. 3 is a diagram showing a printed matter.

By printing the image for obtaining the content, a printed matter P shown in FIG. 3 is generated. The printed matter P is a medium (for example, a photosensitive film F described below) on which the target image and an identification image are printed.

Moreover, as shown in FIG. 3, an image forming surface of the printed matter P includes a target image region Pa and a second image region Pb. In the target image region Pa, the printed target image (that is, a visualized image of the target image) is present on the image forming surface.

Moreover, in the target image region Pa, a region (hereinafter, a first image region) corresponding to the first image set in the target image is present. The first image is a template image in a case of displaying the AR content, and is composed of a part or all of the target image. The template image functions as a marker which is a target to be followed (tracked) in a case in which the AR content is displayed. In the case shown in FIG. 3, for example, a face of a subject in the target image is set as the template image.

The second image region Pb is a region on which an optically readable second image, such as a QR code (registered trademark), is printed. The second image is an image generated in accordance with a storage destination of the AR content set by the first user, and more specifically, is an image obtained by encoding (barcoding) the storage destination. It should be noted that the second image is not limited to an encoded image, such as a QR barcode (registered trademark), need only be a readable image, and may be, for example, a character, a symbol, a number, an encrypted character, or the like. Moreover, the second image may include encrypted information in which information for specifying the first image in the target image is encrypted.

As shown in FIG. 3, the second image region Pb may be provided at a position overlapping the target image region Pa, or may be provided at a position spaced from the target image region Pa. In this case, it is preferable that the second image region Pb be disposed in the vicinity of the target image region Pa.

Then, as shown in FIG. 3, the second user reads the printed matter P by using the second terminal 12 provided with a reading function. Reading the printed matter P means to acquire a read image of the printed matter P, and the read image represents the density (specifically, a gradation value) of the printed matter P for each pixel and is acquired by reading the printed matter P. To be easy to understand, imaging (capturing) the printed matter P with an imaging device corresponds to reading the printed matter P, and the captured image (real-time image) corresponds to the read image.

In a case in which the printed matter P is read, the read image is transmitted from the second user as shown in FIG. 2B. At this stage, the read image, that is, the real-time image of the printed matter P is displayed on the display screen of the second terminal 12.

In the content provision service, the storage destination of the AR content set by the first user is specified based on a portion in which the second image region Pb is reflected (that is, a portion corresponding to the second image) in the read image transmitted from the second user. Then, the display data for displaying the AR content stored in the specified storage destination is transmitted (that is, downloaded) to the second user. The display data is received by the second terminal 12. As a result, the AR content is provided to the second user.

As shown in FIGS. 1A to 1D, the AR content is combined with the read image and displayed on the display screen of the second terminal 12 that has received the display data. In this case, the AR content is displayed in accordance with the display condition set by the first user, and specifically, is displayed in the display size, the display position, and the orientation designated by the first user. In particular, the display position of the AR content is decided in accordance with a portion in the display screen in which the first image region is reflected (that is, a portion corresponding to the first image in the read image). As a result, the AR content is displayed on the display screen in a state in which the positional relationship with the portion in which the first image region is reflected is kept uniform.

With the content provision service as described above, for example, the first user sells the image, and the second user purchases the image (target image) from the first user and prints the purchased image to acquire the printed matter P. Then, in a case in which the second user reads the printed matter P by the second terminal 12, the AR content set by the first user is combined with the read image and displayed on the display screen of the second terminal 12. As a result, the second user can use the AR content provided through the content provision service.

As a side note regarding the content provision service, the use of the service for providing the AR content may be charged or free of charge. In the present embodiment, the use of the service is charged, and the second user can use the AR content only in a case in which the charge of the AR content (strictly speaking, the display data of the AR content) is paid, that is, can display the AR content on the second terminal 12.

It should be noted that a part or all of the charges for the AR content paid by the second user may be remitted to the first user who has sold the target image, or may be remitted to a predetermined remittance destination other than the first user. Examples of the predetermined remittance destination other than the first user include a business operator that operates the content provision service.

With the configuration described above, the charge for the AR content paid by the second user can be distributed between the first user and a service business operator.

Moreover, a certain limitation may be provided for the provision of the AR content to the second user, that is, the transmission of the display data of the AR content. For example, a period during which the AR content can be provided to the second user may be limited to a certain period after the second user purchases the image (target image) from the first user. Moreover, the number of transmission available times of the display data of the AR content may be determined, and the AR content may be able to be provided to the second user until a remaining number of the number of transmission available times set for the second user is 0. On the contrary, in a case in which the remaining number is 0, the provision of the AR content to the second user may be limited (ends).

Moreover, the content provided to the second user by the second user reading the printed matter P may be the same content or may be changed in accordance with a reading time. That is, the content provided by reading the same printed matter P may be updated in accordance with a time or the like.

Content Provision System

Next, a configuration of a communication system, that is, a content provision system S, which is constructed to realize the content provision service, will be described with reference to FIG. 4.

Figure 4:
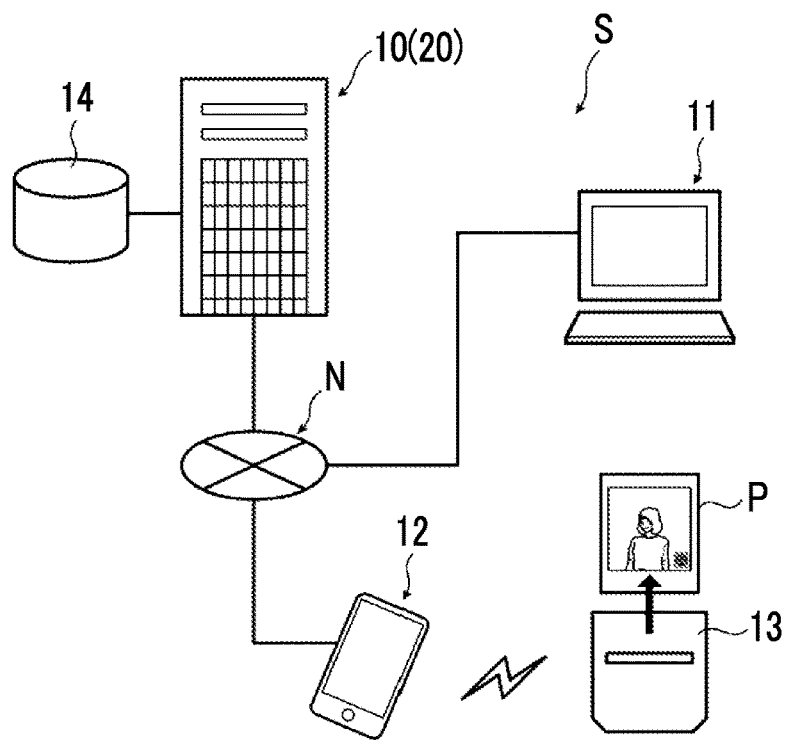
FIG. 4 is a diagram showing a configuration of a content provision system.

As shown in FIG. 4, the content provision system S is composed of a server computer 10, the first terminal 11, the second terminal 12, the portable printer 13, and the like.

In the following, each device will be described.

Server Computer

The server computer 10 is a computer that forms a platform for the content provision service and constitutes a content provision device 20 according to the embodiment of the present invention. The server computer 10 may be a server for a cloud service, specifically, a server computer for an application service provider (ASP), a software as a service (SaaS), a platform as a service (PaaS), or an infrastructure as a service (IaaS).

The server computer 10 can communicate with the first terminal 11 and the second terminal 12 via an external network N, such as the Internet or a mobile communication network, and acquires various information from these devices. The acquired information is stored in a storage device 14, and the server computer 10 can read out the information stored in the storage device 14. The storage device 14 is composed of, for example, a storage built in or external to the server computer 10 or a network attached storage (NAS). It should be noted that the present invention is not limited to this, and the storage device 14 may be a third computer capable of communicating with the server computer 10, for example, a so-called online storage.

Then, the server computer 10 executes various information processing related to the content provision service. Specifically, the server computer 10 generates the data for printing of the image for obtaining the content and transmits the data to the second user (see FIG. 2A). Moreover, the server computer 10 generates the display data of the AR content and transmits the data to the second user (see FIG. 2B).

First Terminal

The first terminal 11 is a device operated by the first user, and is composed of a personal computer (PC) or a workstation, a smartphone, a tablet terminal, or the like. The first terminal 11 receives an operation performed by the first user to use the content provision service. Examples of the operation received by the first terminal 11 include an image designation operation, a printing condition designation operation, an AR content setting operation, and a display condition setting operation.

The image designation operation is an operation of designating the target image to be transmitted (transferred) to the second user from the image group held by the first user. Moreover, the image designation operation may include an editing operation of performing treatment processing, such as trimming, or image processing, such as image quality adjustment, on the designated target image.

In a case in which the image designation operation is received, the first terminal 11 transmits the target image designated by the operation to the server computer 10. In this case, the target image or the edited image is transmitted in association with ID information of the first user (strictly speaking, the first terminal 11).

The printing condition designation operation is an operation of setting a printing condition in a case in which the image for obtaining the content including the target image is printed by the second user side. Specifically, the first user designates, as the printing condition, the second user who performs the printing and a medium designated as the medium on which the image for obtaining the content is printed (hereinafter, a designated medium). Moreover, the printing condition may include, for example, the layout of each of the target image and the second image in the image for obtaining the content and a printing size of each image.

In the present embodiment, the first user checks ID information of the second user (strictly speaking, the second terminal 12), the type of the portable printer 13 used by the second user, and the like in advance, and sets the printing condition after grasping such information. In a case in which the printing condition designation operation is received, the first terminal 11 transmits information (hereinafter, designated information) on the printing condition designated by the first user side to the server computer 10. In this case, the designated information is transmitted in association with the ID information of the first user (strictly speaking, the first terminal 11).

Here, as a case in which the printing condition is designated by the first user side, in addition to the case in which the first user operates the first terminal 11 to designate the printing condition, as described below, a case in which the printing condition is automatically designated by the first terminal 11 used by the first user is included.

It should be noted that the method of acquiring the information related to the type of the portable printer 13 of the second user, the printing size, and the like (hereinafter, printer information) is not limited to the method described above. For example, the printer information is stored in the second terminal 12 or is stored in the server computer 10 in association with the ID information of the second user. In this case, the first terminal 11 may acquire the printer information by communicating with the second terminal 12 or the server computer 10. Moreover, the first terminal 11 may automatically set the printing condition including the designated medium based on the acquired printer information.

The AR content setting operation is an operation of setting the AR content provided to the second user, and is, for example, an operation of creating (inputting) the message in a case in which the AR content is the message. Moreover, in a case in which a plurality of candidates are prepared in advance as the AR content that can be provided, the first user may perform an operation of selecting one or two or more candidates as the AR content setting operation.

In a case in which the AR content setting operation is received, the first terminal 11 transmits the AR content set (specifically, created or selected) by the first user to the server computer 10. In this case, the AR content is transmitted in association with the ID information of the first user (strictly speaking, the first terminal 11).

The display condition setting operation is an operation of setting a display condition in a case of displaying the AR content by the second user side, and specifically, setting the display size, the display position, the orientation, and the like of the AR content.

In a case in which the display condition setting operation is received, the first terminal 11 transmits the information on the display condition set by the first user (hereinafter, setting information) to the server computer 10. In this case, the setting information is transmitted in association with the ID information of the first user (strictly speaking, the first terminal 11).

Second Terminal

The second terminal 12 is a device which is operated by the second user and is provided with the reading function, and is, specifically, composed of a smartphone, a tablet terminal, and the like comprising an imaging device, such as a camera. The second terminal 12 receives an operation performed by the second user to use the content provision service. Examples of the operation received by the second terminal 12 include a purchase operation, a payment operation, and a reading instruction operation.

The purchase operation is an operation performed in a case in which the second user purchases the image from the first user. In a case in which the purchase operation is received, the second terminal 12 transmits information for specifying the image which is a purchase target to the server computer 10. It should be noted that the information for specifying the image which is the purchase target is transmitted from the server computer 10 to the first terminal 11 in association with the ID information of the second user (strictly speaking, the second terminal 12).

The payment operation is an operation performed in a case in which the second user pays the charge for the AR content (specifically, the charge for the display data of the AR content), that is, a settlement operation. In a case in which the purchase operation is received, the second terminal 12 transmits information related to the payment of the charge to the server computer 10.

The reading instruction operation is an operation performed in a case in which the second user gives an instruction to read the printed matter P. In a case in which the second terminal 12 receives the reading instruction operation, a reading device (that is, the imaging device) of the second terminal 12 is activated. Then, in a state in which an imaging unit (specifically, an imaging lens) of the reading device faces the printed matter P, reading (imaging) of the printed matter P is started. As a result, a live video of the read image is displayed on the display screen of the second terminal 12. Moreover, the second terminal 12 transmits the read image to the server computer 10. In this case, the read image is transmitted in association with the ID information of the second user (strictly speaking, the second terminal 12).

Moreover, in a case in which the second terminal 12 receives the data for printing from the server computer 10, the second terminal 12 controls the portable printer 13 in accordance with the data for printing, and causes the portable printer 13 to print the image for obtaining the content. It should be noted that, in a case of the image printing, the second terminal 12 may inquire of the second user whether or not the printing execution is necessary. In this case, the second terminal 12 may cause the portable printer 13 to print the image for obtaining the content on a condition that the second user replies that the printing execution is necessary.

Moreover, in a case in which the display data of the AR content is received from the server computer 10, the second terminal 12 expands the display data to display the AR content. In this case, the AR content is displayed on the display screen of the second terminal 12 in accordance with the display condition set by the first user. Specifically, the AR content is combined with the read image of the printed matter P displayed on the display screen and displayed. In this case, the AR content is displayed in the display position, the display size, and the orientation set by the first user. In particular, the display position of the AR content on the display screen is decided in accordance with the portion in the read image in which the first image region is reflected.

Portable Printer

The portable printer 13 is a device used by the second user to print the image for obtaining the content, and is wirelessly connected to the second terminal 12 by Wi-Fi (registered trademark) or Bluetooth (registered trademark). It should be noted that the present invention is not limited to this, and the portable printer 13 may be connected to the second terminal 12 by a wired method.

Then, the portable printer 13 prints the image under the control of the second terminal 12.

The portable printer 13 according to the present embodiment prints the image by an instant photographic method. That is, the portable printer 13 accommodates the photosensitive film inside and exposes the image forming surface of the photosensitive film to form a latent image. Next, the portable printer 13 breaks a developer pot provided at an end part of the film to develop developer on a film surface, and visualizes the latent image. Through this step, the photosensitive film is ejected to the outside of the printer, the development proceeds, and finally, a complete image is formed on the image forming surface of the photosensitive film. As a result, the printed matter P is formed.

It should be noted that the image printing method is not limited to the instant photographic method, and may be an inkjet method, a sublimation-type thermal transfer method, an electrophotographic method using a toner, or the like.

The photosensitive film is the medium on which the image is printed, and is a film dedicated to the portable printer 13. Moreover, there is a plurality of types of the size of the photosensitive film that can be used for the portable printer 13, and which type of film is used is decided in accordance with the type of the portable printer 13. Specifically, in the present embodiment, there are a plurality of types of the portable printer 13, and the size of the photosensitive film is decided to be one of the sizes according to the type of the portable printer 13 used by the second user.

Then, in the present embodiment, even in a case in which the same image is printed, the size of the printed image is changed in accordance with the size of the photosensitive film. Therefore, in a case in which the image for obtaining the content is printed on the photosensitive film, the size of the target image region Pa, in other words, the position of the first image is changed in accordance with the size of the photosensitive film. Therefore, in a case in which the image for obtaining the content is printed by the second user side, it is necessary to designate the type (size) of the photosensitive film used by the second user. Therefore, in the present embodiment, the data for printing is generated in accordance with the type of the designated photosensitive film (corresponding to the designated medium), and the generated data is transmitted to the second user, specifically, the second terminal 12.

Configuration Example of Content Provision Device

Next, a configuration example of the content provision device 20 according to the present embodiment will be described. As described above, the content provision device 20 according to the present embodiment is composed of the server computer 10. It should be noted that the number of computers constituting the content provision device 20 may be one or two or more. That is, the content provision device 20 is realized by a processor and a program that can be executed by the processor, and is composed of, for example, a general-purpose computer.

Figure 5:
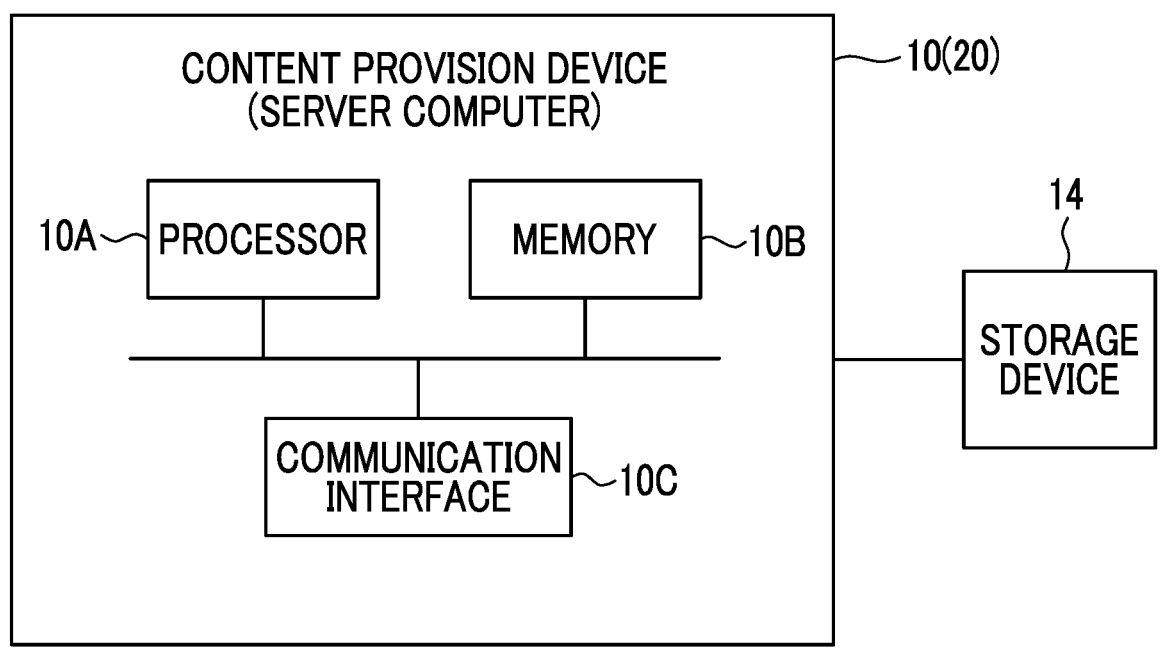
FIG. 5 is a diagram showing a hardware configuration of a content provision device according to one embodiment of the present invention.

As shown in FIG. 5, the server computer 10 that constitutes the content provision device comprises a processor 10A, a memory 10B, a communication interface 10C, and the like.

The processor 10A is composed of, for example, a central processing unit (CPU), a graphics processing unit (GPU), a digital signal processor (DSP), or a tensor processing unit (TPU).

The memory 10B is composed of, for example, a semiconductor memory, such as a read only memory (ROM) and a random access memory (RAM).

The communication interface 10C is composed of, for example, a network interface card or a communication interface board.

Moreover, a program for functioning as the content provision device according to the embodiment of the present invention (hereinafter, a program for the content provision) is installed in the server computer 10. The program for the content provision is a program for causing the computer to execute each step included in the content provision method according to the embodiment of the present invention. That is, the processor 10A reads out the program for the content provision and executes the series of processing related to the content provision service described above.

It should be noted that the program for the content provision may be acquired by being read from a computer-readable recording medium, or may be acquired by being received (downloaded) through a communication line, such as the Internet or an intranet.

The content provision device 20 is connected to the storage device 14 and can read out the information stored in the storage device 14. The information necessary for the content provision service is stored in the storage device 14, and for example, the information or the image acquired by the content provision device 20 from the first terminal 11 and the second terminal 12 is stored. Moreover, management data for managing a usage record of the content provision service or the like is stored in the storage device 14 for each user.

The management data includes information related to the user of the content provision service, information related to the AR content to be provided, information related to a provision record of the content, and the like. More specifically, as shown in FIG. 6, the management data includes the ID information of the first terminal 11 of the first user, the storage destination of the AR content set by the first user, and the ID information of the second terminal 12 of the second user to whom the AR content is provided. Moreover, the management data includes the printer information indicating the type or the like of the portable printer 13 used by the second user. In addition, the management data includes, with respect to the second user, the presence or absence of the payment for the charge of the AR content, a payment amount, and a provision available period and the number of provision available times of the AR content.

Figure 7:
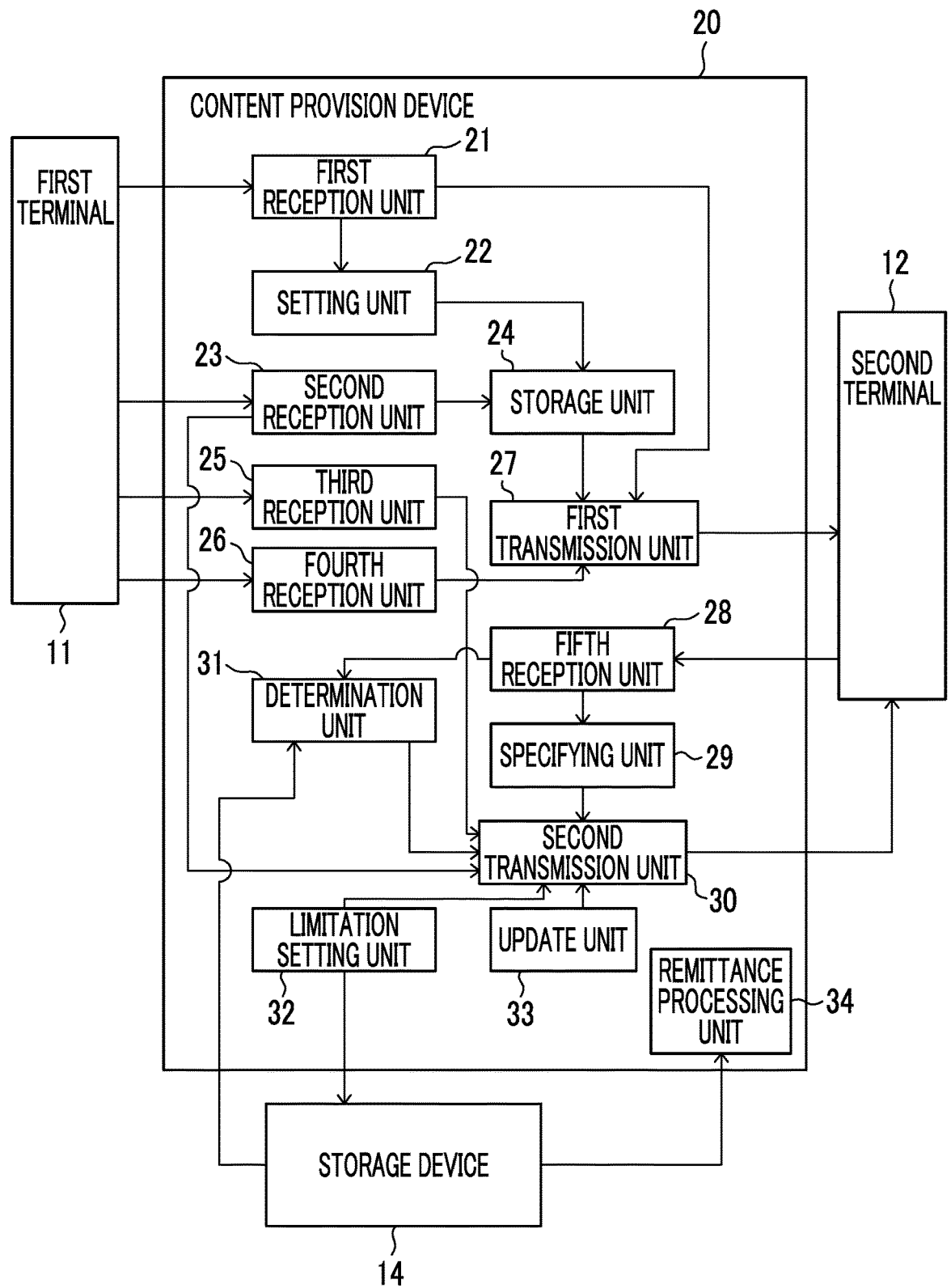
FIG. 7 is an explanatory diagram showing a function of the content provision device according to one embodiment of the present invention.

The configuration of the content provision device 20 will be described again from a functional aspect with reference to FIG. 7. The content provision device 20 includes a first reception unit 21, a setting unit 22, a second reception unit 23, a storage unit 24, a third reception unit 25, a fourth reception unit 26, a first transmission unit 27, a fifth reception unit 28, a specifying unit 29, and a second transmission unit 30. Moreover, the content provision device 20 includes a determination unit 31, a limitation setting unit 32, an update unit 33, and a remittance processing unit 34. These functional units are realized by the cooperation between a hardware device provided in the server computer 10 and the software including the program for the content provision described above.

The first reception unit 21 receives the target image transmitted from the first terminal 11. The received target image is stored in the storage device 14, for example.

The setting unit 22 sets the first image for the target image acquired by the first reception unit 21. In this case, the setting unit 22 sets a part or all of the target image as the first image. For example, in a case in which a person is reflected in the target image, the face of the person may be set as the first image. It should be noted that the first image may be set based on a part of the target image instructed by the first user, or may be automatically set by the setting unit 22.

The second reception unit 23 receives the AR content (that is, the content displayed on the display screen of the second terminal 12) which is set by the first user and provided to the second user. It should be noted that, in a case in which the first user selects one or two candidates from among the plurality of candidates in order to set the AR content, the second reception unit 23 receives the selection result.

The storage unit 24 stores the AR content received by the second reception unit 23 in association with the first image set by the setting unit 22. The storage destination of the AR content is not particularly limited, and for example, the storage device 14 may be used. Moreover, from the viewpoint of reducing the data capacity of the content provision device 20, the storage device 14 other than the content provision device 20 is preferable as the storage destination of the AR content.

Moreover, the storage unit 24 generates the second image (for example, an encoded image, such as a QR code (registered trademark)), in accordance with the storage destination of the AR content.

The third reception unit 25 receives and acquires the setting information indicating the content (setting content) set by the first user regarding the display condition of the AR content from the first terminal 11. The display condition indicated by the setting information includes the display size, the display position, the orientation, and the like of the AR content. The display position is a position decided with the first image described above as a reference.

The fourth reception unit 26 receives the designated information indicating the printing condition designated by the first user for the image for obtaining the content including the target image and the second image from the first terminal 11. The printing condition indicated by the designated information includes the size of the photosensitive film on which the image for obtaining the content is printed (in other words, the type of the portable printer 13), the layout of each of the target image and the second image, and the printing size of each image. Moreover, the designated information includes the ID information of the second user who prints the image for obtaining the content.

The first transmission unit 27 generates the data for printing and transmits the data to the second terminal 12. The data for printing is the data for printing the image for obtaining the content in accordance with the printing condition indicated by the designated information received by the fourth reception unit 26. By the first transmission unit 27 transmitting the data for printing, the image for obtaining the content is printed on the photosensitive film of which the type (size) is designated by the first user, on the second user side.

It should be noted that the data for printing is data that cannot be changed (overwritten) by the second terminal 12. That is, the second user can print the image for obtaining the content only in the case of using the photosensitive film of the size designated by the first user.

The fifth reception unit 28 receives the read image of the printed matter P from the second terminal 12. The printed matter P is generated by printing the image for obtaining the content in accordance with the data for printing described above, and the read image is acquired by the second user reading the printed matter P by using the second terminal 12. It should be noted that, in a case of receiving the read image from the second terminal 12, the fifth reception unit 28 receives the read image in association with the ID information of the second terminal 12.

The specifying unit 29 analyzes the read image received by the fifth reception unit 28, and specifies the storage destination of the AR content from the portion (portion corresponding to the second image) in which the second image region Pb is reflected in the read image.

The second transmission unit 30 creates the display data of the AR content stored in the storage destination specified by the specifying unit 29 and transmits the created display data to the second terminal 12. In this case, in the second terminal 12, the read image of the printed matter P is displayed on the display screen.

Then, in a case in which the display data is received by the second terminal 12, the AR content, that is, the AR content set by the first user is displayed on the display screen in a state of being combined with the read image. Specifically, the AR content is displayed at a position in the display screen corresponding to the portion (portion corresponding to the first image) in the read image in which the first image region is reflected.

Moreover, the AR content is displayed in accordance with the display condition (setting content) indicated by the setting information received by the third reception unit 25.

The determination unit 31 determines whether or not the second user to which the AR content is provided has paid the charge for the AR content (specifically, the charge for the display data of the AR content). Specifically, the determination unit 31 specifies the ID information of the second terminal 12 associated with the read image received by the fifth reception unit 28, and refers to the management data corresponding to the ID information. Then, the determination unit 31 determines whether or not the second user who uses the second terminal 12 has paid the charge.

In a case in which the determination unit 31 determines that the second user has paid the charge, the second transmission unit 30 transmits the display data of the AR content to the second terminal 12 of the second user. On the contrary, in a case in which the second user has not paid the charge, the provision of the AR content is not executed to the second user, that is, the display data of the AR content is not transmitted to the second terminal 12 of the second user. In this way, in the present embodiment, the AR content can be displayed only on the second terminal 12 of the second user who has purchased the target image.

The limitation setting unit 32 sets the limitation for the provision of the AR content to the second user (that is, transmission of the display data of the AR content to the second terminal 12). Specifically, the limitation setting unit 32 sets the provision available period of the AR content for the second user. The second transmission unit 30 transmits the display data of the AR content to the second terminal 12 of the second user only within the provision available period set for the second user.

Moreover, the limitation setting unit 32 sets the number of provision available times of the AR content, that is, the number of transmission available times of the display data of the AR content for the second user. Further, the limitation setting unit 32 decreases the number of transmission available times of the second user in accordance with the number of execution times of the processing of transmitting the display data to the second terminal 12 by the second transmission unit 30. Then, in a case in which the number of transmission available times of the second user is 0, the transmission of the display data to the second terminal 12 of the second user is limited thereafter.

It should be noted that the number of provision available times of the AR content (the number of transmission available times of the display data) may be any number of times, or may be, for example, only once. That is, after the AR content is provided to the second user once, the provision of the AR content (transmission of the display data) may be limited.

The method of limiting the provision of the AR content is not particularly limited, and the provision of the AR content (transmission of the display data) may be prohibited, or the AR content itself may be deleted from the storage destination. Further, in a case in which the limitation is set, a notification prompting billing for releasing the limitation may be transmitted to the second user.

In a case in which a predetermined condition (hereinafter, an update condition) is satisfied, the update unit 33 updates the AR content provided in a case in which the second user reads the same printed matter P. That is, the target of the update by the update unit 33 is the AR content which is associated with the same first image and is stored in the storage destination specified by the second image.

The AR content after the update may be set by the first user, for example. That is, in a case in which the update condition is satisfied, the first user newly sets the AR content and the display condition, the second reception unit 23 receives and acquires the new AR content, and the third reception unit 25 receives and acquires the setting information indicating the new display condition. The update unit 33 stores the new AR content as the AR content after the update in the storage destination of the AR content before update. In this case, the AR content after the update is associated with the first image associated with the AR content before the update.

It should be noted that, in a case in which the AR content is updated, it is preferable to notify the second user of that effect.

In a case in which the second transmission unit 30 transmits the display data of the AR content to the second terminal 12 after the content is updated, the display data of the AR content after the update is transmitted. As a result, the second terminal 12 displays the AR content after the update at a position in the display screen corresponding to the portion in the read image in which the first image region is reflected.

It should be noted that the update condition is not particularly limited and may be any condition, but may be set in association with the second user, for example. Specifically, the update condition may be that a predetermined period elapses from the first reading of the printed matter P by the second user, or that the birthday of the second user arrives.

The remittance processing unit 34 executes processing of remitting an amount of at least a part of the charges for the AR content paid by the second user to a predetermined remittance destination (hereinafter, remittance processing). The remittance processing is, for example, processing of remitting the charge to the account of the first user or the business operator of the content provision service, and the processing contents, the procedure, and the like thereof are the same as the remittance processing in a known electronic commerce transaction.

Information Processing Flow for Providing Content According to One Embodiment of Present Invention An information processing flow (hereinafter, a content provision flow) by the content provision device according to one embodiment of the present invention will be described. In the content provision flow, the content provision method according to the embodiment of the present invention is adopted. In other words, each step in the content provision flow corresponds to a component of the content provision method according to the embodiment of the present invention.

Figure 8:
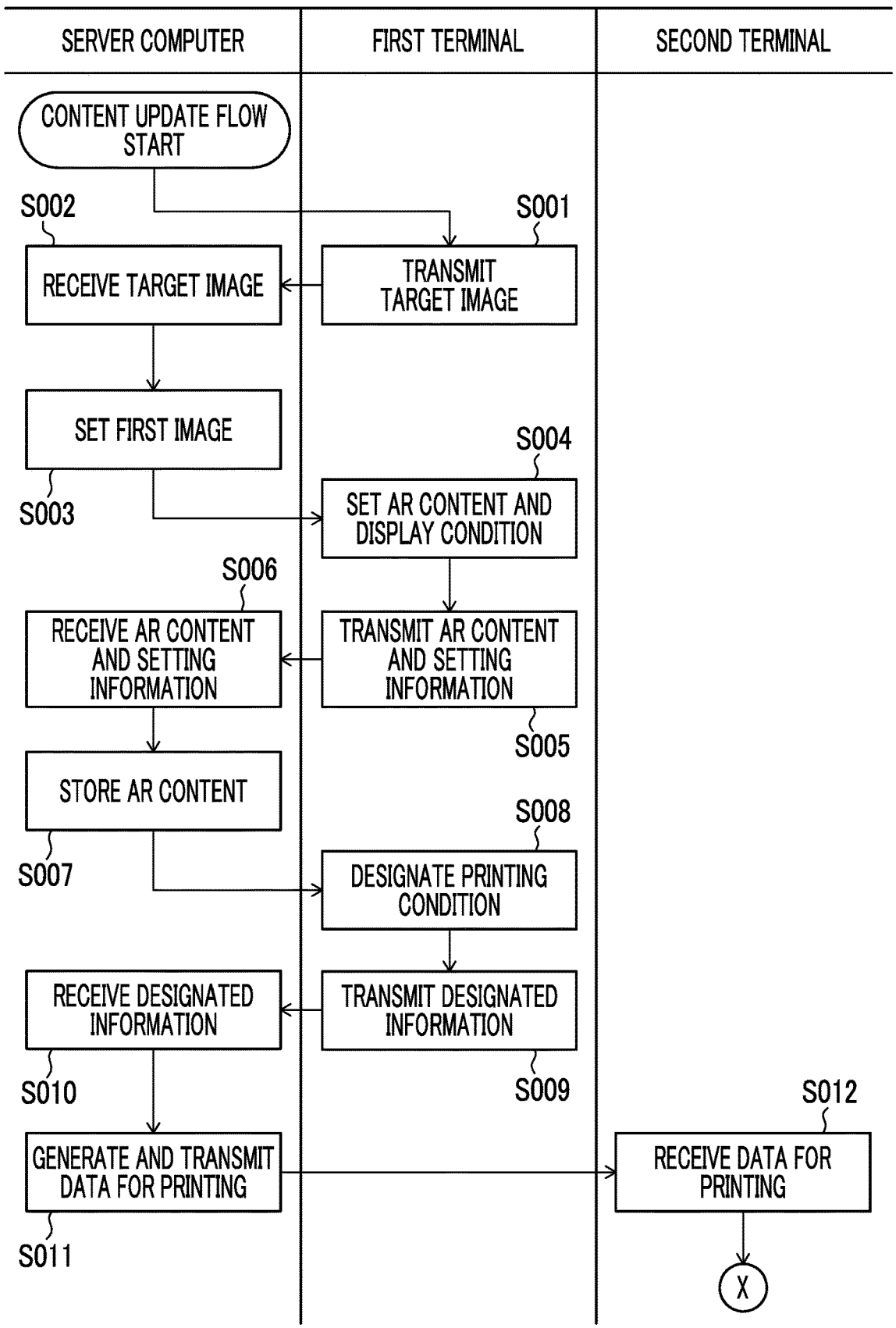
FIG. 8 is a diagram showing a content provision flow according to one embodiment of the present invention (part 1).
Figure 9:
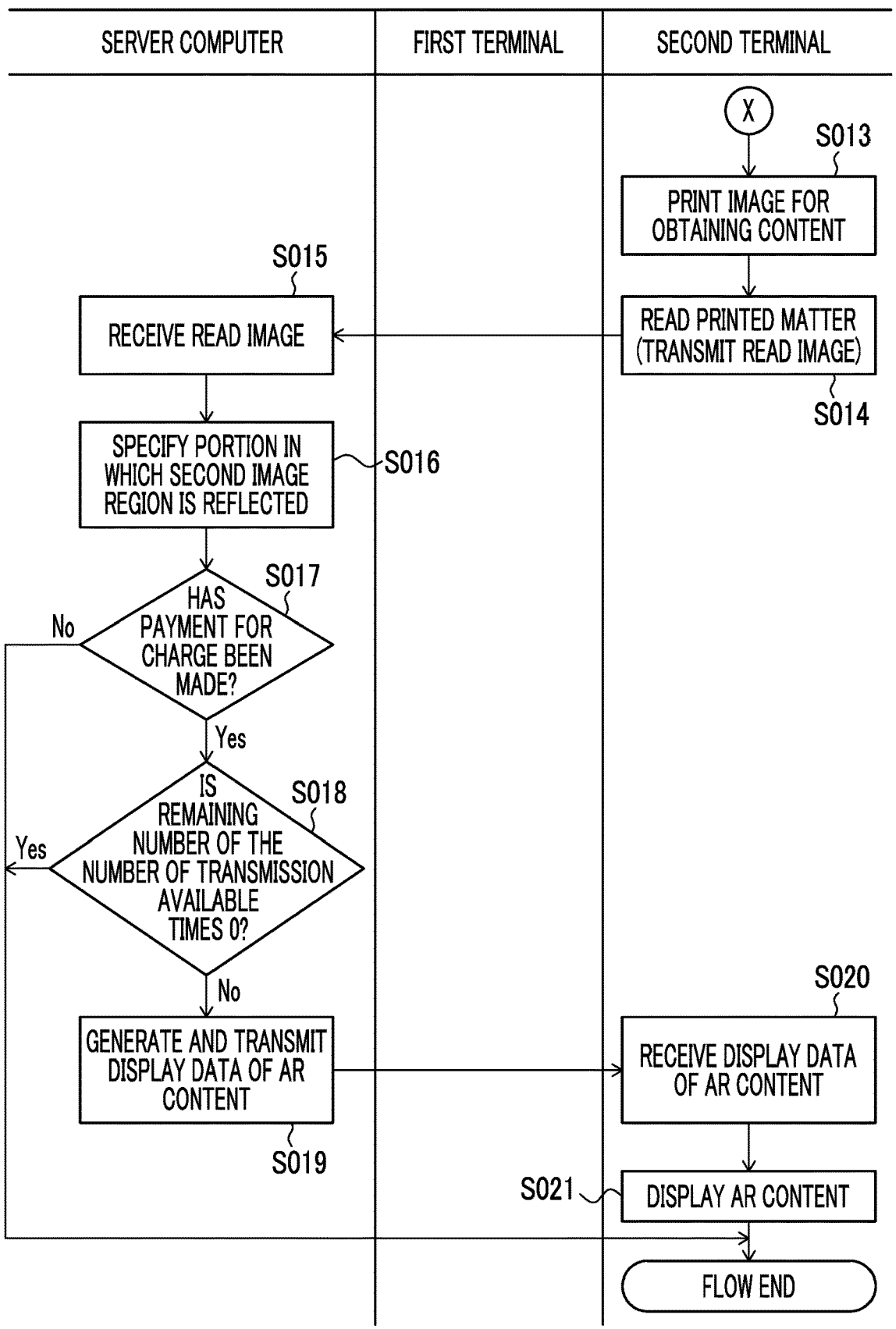
FIG. 9 is a diagram showing the content provision flow according to one embodiment of the present invention (part 2).

The content provision flow proceeds according to the flow shown in FIGS. 8 and 9. Moreover, each step in the content provision flow is executed in cooperation between the processor 10A of the server computer 10 constituting the content provision device 20 and each of the first terminal 11 and the second terminal 12.

The content provision flow is started, for example, by using the purchasing of the image from the first user by the second user as a trigger. In the content provision flow, first, the first terminal 11 transmits the image purchased by the second user, that is, the target image, to the server computer 10 (S001). The processor 10A of the server computer 10 receives the target image from the first terminal 11 (S012). In this case, the processor 10A also acquires the information of the second terminal 12 of the second user who has purchased the target image.

Next, the processor 10A sets at least a part of the target image as the first image (S003). In S003, the processor 10A may set the first image based on the editing operation for the target image performed by the first user on the first terminal 11, or may automatically set the first image in accordance with a predetermined setting criterion.

Next, the first terminal 11 sets the AR content provided to the second user and displayed on the display screen of the second terminal 12 and the display condition thereof based on the operation by the first user (S004). Thereafter, the first terminal 11 transmits the set AR content and the setting information indicating the set display condition to the server computer 10 (S005). The processor 10A receives and acquires the AR content and the setting information from the first terminal 11 (S006).

Next, the processor 10A stores the AR content received in S006 in association with the first image set in S003 (S007). In this case, the setting information may also be stored in association with the first image together with the AR content. Moreover, in S007, the processor 10A encodes the information indicating the storage destination of the AR content to generate the second image.

Next, the first terminal 11 designates the printing condition of the image for obtaining the content including the target image and the second image based on the operation by the first user (S008). More specifically, in S008, the type (size) of the photosensitive film used for printing the image for obtaining the content is designated as the printing condition. Thereafter, the first terminal 11 transmits the designated information indicating the designated printing condition to the server computer 10 (S009). The processor 10A receives the designated information from the first terminal 11 (S010).

Next, the processor 10A generates the data for printing for printing the image for obtaining the content in accordance with the printing condition indicated by the designated information, and transmits the generated data to the second terminal 12 (S011). The data for printing is received by the second terminal 12 of the second user who has purchased the target image (S012).

Next, the second terminal 12 controls the portable printer 13 in accordance with the data for printing to print the image for obtaining the content on the portable printer 13 (S013). As a result, the image for obtaining the content is printed on the photosensitive film of which the type (size) is designated by the first user, and as a result, the second user acquires the printed matter P.

Next, the second terminal 12 uses the reading function to read the printed matter P, and the read image is transmitted to the server computer 10 (S014). In this case, the read image is transmitted in association with the ID information of the second terminal 12 which is the transmission source. The transmitted read image is received by the processor 10A (S015).

Next, the processor 10A analyzes the read image received in S015 and extracts the portion (portion corresponding to the second image) in the read image in which the second image region Pb is reflected. Then, the processor 10A specifies the storage destination of the AR content, which is set by the first user and provided to the second user, from the extracted portion (S016). Moreover, the processor 10A reads out the AR content from the specified storage destination.

Next, the processor 10A determines whether or not the second user, who is a provision destination of the AR content, has paid the charge for the AR content (charge for the display data of the AR content) (S017). In a case in which the second user has paid the charge, the processing proceeds to S018, and in a case in which the second user has not paid the charge, the flow ends.

Next, the processor 10A determines whether or not the remaining number of the number of transmission available times of the display data set for the second user is 0 (S018). In a case in which the remaining number is not 0, the processing proceeds to S019, and in a case in which the remaining number is 0, the flow ends.

Next, the processor 10A generates the display data of the AR content stored in the storage destination specified in S016, and transmits the generated display data to the second terminal 12 (S019). In a case in which the display data is received (S020), the second terminal 12 expands the display data and displays the AR content on the display screen (S021). In this case, the read image (that is, the real-time image of the printed matter P) is displayed on the display screen of the second terminal 12, and the AR content is displayed in a state of being combined with the read image. That is, in S019, the display data for displaying the AR content in a state in which the AR content is combined with the read image displayed on the display screen is transmitted to the second terminal 12.

Moreover, in S021, the AR content is displayed in accordance with the display condition indicated by the setting information received in S006. More specifically, the AR content is displayed at the position of the display screen decided with, as a reference, the portion (portion corresponding to the first image) in the read image in which the first image region is reflected. That is, in S019, the display data for displaying the AR content in accordance with the display condition, more specifically, the display data for displaying the AR content at the position corresponding to the portion in the display screen in which the first image region is reflected, is transmitted on the second terminal 12.

At a point in time at which the series of steps up to the above ends, the content provision flow ends. With the content provision flow according to the present embodiment, it is possible to appropriately display the AR content provided by printing the image for obtaining the content acquired via the network and reading the printed matter P.

Specifically, the size of the printed image is changed as the type (size) of the photosensitive film used for printing the image for obtaining the content is changed. In that case, the position of the first image (that is, the template image) in the printed image is changed. Therefore, in a case in which a correct type (size) of the photosensitive film is not used, there is a probability that the AR content is not displayed at an appropriate position. In such a situation, there is a concern that the intention of the first user who has set the content is not correctly reflected in displaying of the AR content.

On the other hand, in the present embodiment, as the data for printing of the image for obtaining the content, the data to be printed on the photosensitive film (designated medium) of the type designated by the first user or the first terminal is transmitted to the second terminal 12. Since the data for printing is the data that cannot be changed (overwritten) by the second terminal 12, the image for obtaining the content is printed only on the photosensitive film of the type designated by the first user. As a result, the image for obtaining the content is appropriately printed on the photosensitive film, and the first image is disposed at a regular position in the image for obtaining the content. As a result, in a case in which the printed matter P of the image for obtaining the content is read, the AR content is appropriately displayed on the display screen (specifically, at an appropriate position on the display screen).

Then, the effect described above is particularly significant in a case in which the AR content is combined with the read image of the printed matter P and displayed. That is, in the present embodiment, since the AR content can be appropriately displayed by the procedure described above, it is easy to spread the provision of the AR content through the network printing. As a result, it is possible to activate the content provision service.

Moreover, in the present embodiment, the limitation is provided for the provision of the AR content (in other words, the transmission of the display data of the AR content) from the viewpoints of the time, the number of times, and the like. Accordingly, inappropriate diversion and duplication of the AR content can be avoided, as a result, appropriate use and protection of the AR content can be achieved.

Figure 10:
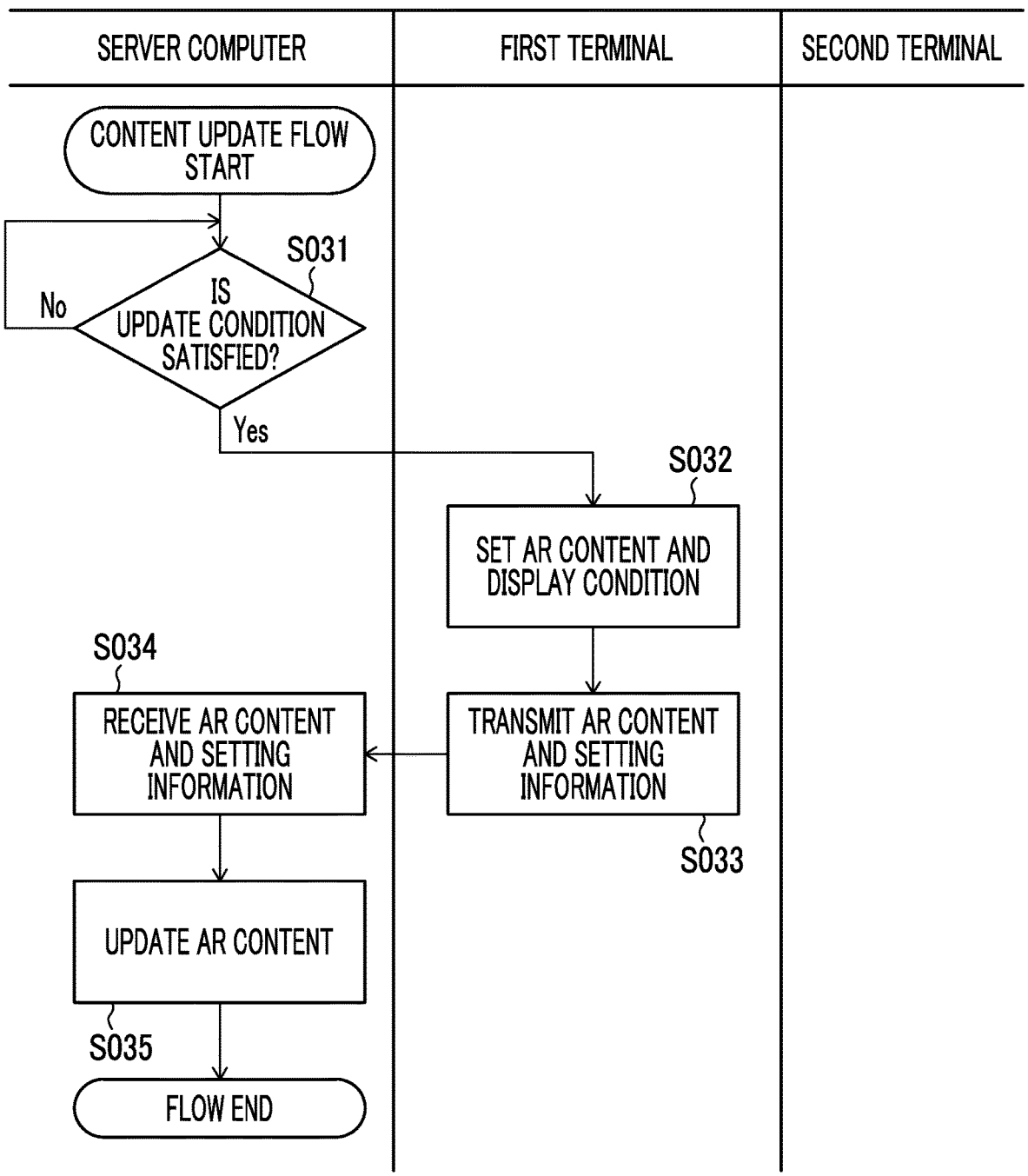
FIG. 10 is a diagram showing a content update flow.

Moreover, in the present embodiment, the content update flow shown in FIG. 10 is separately executed. The content update flow is started in a case in which the update condition is satisfied (S031). At the start of the flow, the first user newly sets the AR content and the display condition thereof, and the first terminal 11 transmits the new AR content and the setting information indicating the new display condition to the server computer 10 (S032, S033).

In a case in which the new AR content and setting information are received (S034), the processor 10A updates the AR content stored in association with the first image in S007 with the new AR content (S035). As a result, the content update flow is completed.

Then, in step S019 of the content provision flow executed after the AR content is updated, the processor 10A transmits the display data of the AR content after the update. With the display data, the AR content after the update is displayed at the position corresponding to the portion in the read image in which the first image region is reflected, on the display screen of the second terminal 12. In this way, by updating the AR content that can be displayed by reading one printed matter P, it is possible to maintain the interest of the second user, specifically, the interest in the provided AR content as compared with a case in which only a single AR content is displayed.

OTHER EMBODIMENTS

The embodiment described above is a specific example given to describe the content provision device and the content provision method according to the embodiment of the present invention in an easy-to-understand manner and is merely an example, and other embodiments can be considered.

In the embodiment described above, the data for printing of the image for obtaining the content is received by the second terminal 12, but the present invention is not limited to this. For example, the portable printer 13 may directly receive the data for printing.

Moreover, in the embodiment described above, from the viewpoint of content protection, a limitation is provided for the provision of the AR content, and specifically, the provision available period and the number of provision available times are set. It should be noted that the present invention is not limited to this, and the limitation to the AR content may be released in a case in which the number of the second users to whom certain AR content is provided (specifically, the number of the second users who have purchased the same target image) is equal to or greater than a predetermined number.

Moreover, in the embodiment described above, even in a case in which the printed matter P is read by the second terminal 12, the AR content is not displayed unless the charge for the AR content is paid. It should be noted that the present invention is not limited to this, and for example, the AR content may be able to be displayed on the display screen in a case in which the user who has not paid the charge for the AR content (for example, family of the second user who has paid the charge) reads the printed matter P by using a smartphone with a camera.

Moreover, in the embodiment described above, the function of the content provision device according to the embodiment of the present invention is exerted by the processor 10A provided in the server computer 10, but the present invention is not limited to this. The processor provided in the content provision device according to the embodiment of the present invention may be provided in the terminal used by the user (that is, the first terminal 11 and the second terminal 12), and the portable printer 13. That is, a part or all of the functional units described above, which are provided in the content provision device according to the embodiment of the present invention may be provided in the first terminal 11, the second terminal 12, or the portable printer 13.

Moreover, the content provision device according to the embodiment of the present invention may be the first terminal 11, that is, the processor provided in the content provision device according to the embodiment of the present invention may be the processor provided in the first terminal 11. In this case, the processor of the first terminal 11 executes each step in the content provision flow described above. That is, the first terminal 11 may acquire the printer information from the second terminal 12, generate the data for printing based on the acquired printer information, and transmit the information to the second terminal 12. Moreover, the first terminal 11 may receive the read image from the second terminal 12, specify the storage destination of the content from the portion in the read image corresponding to the second image, and transmit the display data for displaying the content to the second terminal 12.

The processor provided in the content provision device according to the embodiment of the present invention includes various processors. Examples of the various processors include a CPU, which is a general-purpose processor that executes software (program) and functions as various processing units.

Moreover, various processors include a programmable logic device (PLD), which is a processor of which a circuit configuration can be changed after manufacturing, such as a field programmable gate array (FPGA).

Moreover, the various processors described above also include a dedicated electric circuit, which is a processor having a circuit configuration specially designed for executing specific processing, such as an application specific integrated circuit (ASIC).

Moreover, one processing unit provided in the content provision device according to the embodiment of the present invention may be composed of one of the various processors described above, or may be composed of a combination of two or more processors of the same type or different types, for example, a combination of a plurality of FPGAs or a combination of the FPGA and the CPU.

Moreover, a plurality of functional units provided in the content provision device according to the embodiment of the present invention may be composed of one of various processors, or may be composed of one processor in which two or more of the plurality of functional units are combined.

Moreover, as in the embodiment described above, a form may be adopted in which one processor is composed of a combination of one or more CPUs and software, and the processor functions as the plurality of functional units.

Moreover, for example, as represented by a system on chip (SoC) or the like, a form may be adopted in which a processor is used in which the functions of the entire system which includes the plurality of functional units in the content provision device according to the embodiment of the present invention are realized by a single integrated circuit (IC) chip. Moreover, a hardware configuration of the various processors described above may be an electric circuit (circuitry) in which circuit elements, such as semiconductor elements, are combined.

EXPLANATION OF REFERENCES

10: server computer
10A: processor
10B: memory
10C: communication interface
11: first terminal
12: second terminal
13: portable printer
14: storage device
20: content provision device
21: first reception unit
22: setting unit
23: second reception unit
24: storage unit
25: third reception unit
26: fourth reception unit
27: first transmission unit
28: fifth reception unit
29: specifying unit
30: second transmission unit
31: determination unit
32: limitation setting unit
33: update unit
34: remittance processing unit
A1, A2, A3, A4: content
N: external network
P: printed matter
Pa: target image region
Pb: second image region
S: content provision system

What is claimed is:

1. A content provision device comprising:
a processor,
wherein the processor executes processing of setting at least a part of a target image provided by a first user as a first image,
processing of storing content set by the first user and displayed on a display screen of a terminal of a second user different from the first user in association with the first image,
processing of, in accordance with a printing condition designated by a first user side based on information related to a printer used by the second user, generating first data for printing the target image and a second image on a designated medium which is designated by the first user side, the second image being in accordance with a storage destination of the content,
processing of transmitting the first data to the terminal,
processing of receiving, in a case in which a printed matter generated by printing the target image and the second image on the designated medium in accordance with the first data is read by the terminal, a read image of the read printed matter from the terminal,
processing of specifying the storage destination from a portion corresponding to the second image in the read image, and
processing of transmitting second data for displaying the content stored in the storage destination at a position in the display screen in accordance with a portion corresponding to the first image in the read image, to the terminal.

2. The content provision device according to claim 1, wherein, in the processing of transmitting the second data, the processor transmits the second data for displaying the content in a state in which the content is combined with the read image displayed on the display screen, to the terminal.

3. The content provision device according to claim 1, wherein the processor further executes processing of acquiring setting information indicating a setting content related to display of the content, and
the processor transmits the second data for displaying the content in accordance with the setting content, to the terminal.

4. The content provision device according to claim 3, wherein setting the content is newly creating the content or selecting any one of a plurality of types of the content prepared in advance.

5. The content provision device according to claim 1, wherein, in the processing of transmitting the second data, the processor transmits the second data for displaying the content, which is stored in the storage destination and is set by the first user, to the terminal.

6. The content provision device according to claim 1, wherein, in the processing of transmitting the first data, the processor transmits the first data for printing the target image and the second image on the designated medium of which a size is designated by the first user side, to the terminal.

7. The content provision device according to claim 1, wherein the number of transmission available times of the second data is stored in a storage device for each user,
the processor further executes processing of decreasing the number of transmission available times of the second user in accordance with the number of execution times of the processing of transmitting the second data to the terminal, and
in a case in which a remaining number of the number of transmission available times of the second user is 0, transmission of the second data to the terminal is limited.

8. The content provision device according to claim 1, wherein presence or absence of payment for a charge of the second data is stored in a storage device, and
the processor transmits the second data to the terminal of the second user who has paid the charge.

9. The content provision device according to claim 8, wherein the processor further executes processing of remitting an amount of at least a part of the charges paid by the second user to a predetermined remittance destination.

10. The content provision device according to claim 1, wherein the processor
further executes processing of updating the content stored in the storage destination in association with the first image, and
transmits, in the processing of transmitting the second data to the terminal after the content is updated, the second data for displaying the content after updating at the position.

11. The content provision device according to claim 1, wherein the first user uses a first terminal and the terminal used by the second user is a second terminal, and
in a case in which the first terminal acquires printer information related to a printer used by the second user to print an image, the processor transmits the first data for printing the target image and the second image on the designated medium in accordance with the printer information acquired by the first terminal, to the second terminal.

12. A content provision method comprising:
causing a processor to execute
a step of setting at least a part of a target image provided by a first user as a first image,
a step of storing content set by the first user and displayed on a display screen of a terminal of a second user different from the first user in association with the first image,
a step of, in accordance with a printing condition designated by a first user side based on information related to a printer used by the second user, generating first data for printing the target image and a second image on a designated medium which is designated by the first user side, the second image being in accordance with a storage destination of the content,
a step of transmitting the first data to the terminal,
a step of receiving, in a case in which a printed matter generated by printing the target image and the second image on the designated medium in accordance with the first data is read by the terminal, a read image which is an image of the read printed matter from the terminal,
a step of specifying the storage destination from a portion corresponding to the second image in the read image, and
a step of transmitting second data for displaying the content stored in the storage destination at a position in the display screen in accordance with a portion corresponding to the first image in the read image, to the terminal.

13. The content provision method according to claim 12, wherein, in the step of transmitting the second data, the processor transmits the second data for displaying the content in a state in which the content is combined with the read image displayed on the display screen, to the terminal.

14. A non-transitory computer-readable recording medium in which a program causing a computer to execute each step included in the content provision method according to claim 13 is recorded.

15. The content provision method according to claim 12, wherein the processor further executes a step of acquiring setting information indicating a setting content related to display of the content, and in the step of transmitting the second data, the processor transmits the second data for displaying the content in accordance with the setting content, to the terminal.

16. A non-transitory computer-readable recording medium in which a program causing a computer to execute each step included in the content provision method according to claim 15 is recorded.

17. The content provision method according to claim 15, wherein setting the content is newly creating the content or selecting any one of a plurality of types of the content prepared in advance.

18. The content provision method according to claim 12, wherein the processor further executes a step of updating the content stored in the storage destination in association with the first image, and in the step of transmitting the second data to the terminal after the content is updated, the processor transmits the second data for displaying the content after updating at the position.

19. A non-transitory computer-readable recording medium in which a program causing a computer to execute each step included in the content provision method according to claim 18 is recorded.

20. A non-transitory computer-readable recording medium in which a program causing a computer to execute each step included in the content provision method according to claim 12 is recorded.

* * * * *